UNITED STATES PATENT OFFICE 2,596,776

PRODUCTION OF CYANINE DYESTUFFS

John David Kendall and John Raymond Majer, Ilford, England, assignors to Ilford Limited, Ilford, England, a British company No Drawing. Application February 27, 1947, Serial No. 731,400. In Great Britain March 1, 1946

4 Claims. (Cl. 260—240.1)

This invention relates to the production of dyestuffs and particularly to the production of dyestuffs of the neocyanine type which are sensitising dyes for photographic silver halide emulsions.

Though the dyestuff neocyanine was first isolated in 1925 and improvements in the method of production have been proposed at intervals since that date, the various investigators have hitherto only been able to produce neocyanines in which the three heterocyclic nuclei are of the same type, e. g. all quinoline nuclei or all benzthiazole nuclei.

The present invention provides a new method for the production of the neocyanine type dye wherein the three nuclei may be all of the same type, or one of them may differ from the other two, or all three may be different from one another.

According to this invention dyestuffs are obtained by reacting a carbocyanine of the general formula:

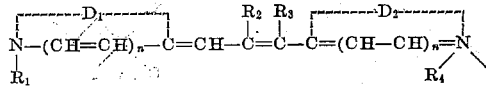

where $D_1$ and $D_2$ are the same or different and are residues of 5-membered or 6-membered heterocyclic nuclei, X is an acid radicle, $R_1$ and $R_4$ are the same or different and are alkyl or aralkyl groups (including hydroxyalkyl or hydroxyaralkyl groups), $R_2$ and $R_3$ are hydrogen atoms or alkyl or aralkyl groups, and $n$ is nought or one, with a trithio orthoformic ester of the formula

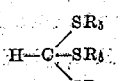

where $R_5$, $R_6$ and $R_7$ are alkyl or aralkyl groups, and a compound of the general formula:

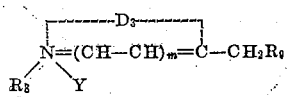

where $D_3$ is the residue of a 5-membered or 6-membered heterocyclic nucleus which may be the same as or different from $D_1$ or $D_2$, $R_8$ is an alkyl or aralkyl group (including an hydroxyalkyl or hydroxyaralkyl group), Y is an acid radicle which may be the same as or different from the radicle X, $R_9$ is an alkyl or aralkyl group or a hydrogen atom, and $m$ is nought or one, the reaction being effected in the presence of a condensing agent which will remove the compounds $R_5SH$, $R_6SH$ and $R_7SH$ from the reaction medium, e. g. by absorption or reaction therewith.

During the condensation the three molecules $R_5SH$, $R_6SH$ and $R_7SH$, which will generally be identical, are split out yielding a product of the probable formula:

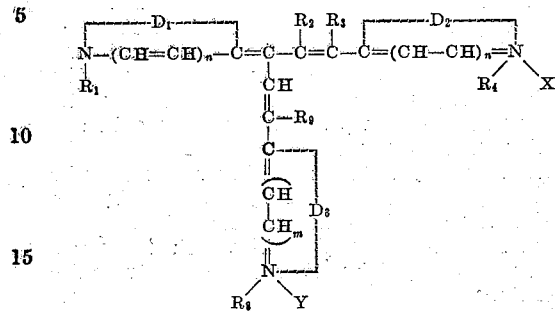

While the groups $R_1$, $R_4$ and $R_8$ are shown in this product as though they had the same significance as that given above, it will be appreciated that if any of them were hydroxyalkyl, or hydroxyaralkyl groups in the original compounds, such hydroxy groups may be converted into other groups, e. g. acetoxy groups, in the course of the reaction.

There are, however, several indeterminate factors in this general formula which is set out only as an indication of the general type of product. Thus it is conceivable that some re-arrangement of the molecule may take place. Further, where $D_1$ and $D_2$ are different from one another and $R_3$ is a hydrogen atom, it is uncertain whether the linkage to the $D_3$ nucleus is effected on the carbon atom as shown in the formula or on the carbon atom linked to $R_3$. Where the rings (and ring substituents) of which $D_1$ and $D_2$ form part are the same, however, the products will be identical whichever is the position of linkage.

The heterocyclic nuclei of which the residues $D_1$, $D_2$ and $D_3$ are shown may be any 5-membered or 6-membered heterocyclic nitrogen nuclei of the types common in cyanine dyes, e. g. thiazoles, oxazoles, selenazoles and their polycyclic homologues such as those of the benzene, naphthalene, acenaphthene and anthracene series, pyridine and its polycyclic homologues such as quinoline and α- and β-naphthaquinolines, lepidines, indolenines, diazines (e. g. thio ββ'-diazole), oxazolines, thiazolines and selenazolines. The polycyclic compounds of these series may also be substituted in the carbocyclic rings with one or more groups such as alkyl, aryl, amino, hydroxy, alkoxy and methylene dioxy groups or by halogen atoms.

The groups $R_1$, $R_4$, $R_5$, $R_6$, $R_7$ and $R_8$, and also the groups $R_2$, $R_3$ and $R_9$ where these latter are not hydrogen atoms, are preferably lower alkyl groups, i. e. containing up to 4 carbon atoms, but they may be higher alkyl groups or aralkyl groups such as benzyl or naphthylmethyl.

The acid radicles X and Y may be, for example, halide ions, e. g. chloride, bromide or iodide, or alkyl sulphate, p-toluene sulphonate or perchlorate ions.

The trithio orthoformic ester may be a methyl ester of trithio orthoformic acid or a higher homologue. The ester groups are not of especial importance since they do not appear in the final product, and for this reason it is preferred to use ethyl esters, i. e. compounds in which $R_5$, $R_6$ and $R_7$ are all ethyl groups, since the ethyl mercaptan formed during the condensation may be most readily absorbed. However, as already indicated the ester groups may be other alkyl or aralkyl groups, e. g. benzyl groups.

In most cases the reaction can conveniently be effected by heating the reagents together in the presence of acetic anhydride since that compound forms an excellent absorbing medium for the mercaptan formed during the reaction. However, in cases where the original reagents are likely to be affected by the use of acetic anhydride, a less drastic condensing agent may be employed, e. g. acetic acid or a mixture of acetic acid and succinic acid. Higher fatty acid anhydrides may be used, and in general it may be stated that any acid condensing agent may be employed, the selection being governed by the particular reagents under consideration.

The following examples, in which the parts given are all by weight, will serve to illustrate the invention:

*Example 1*

Preparation of the compound of the probable formula:

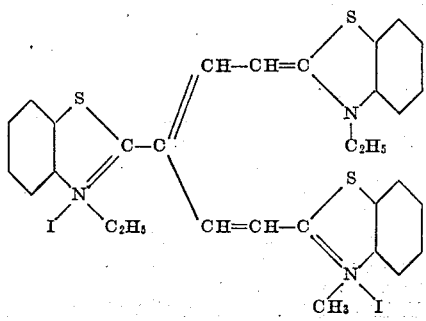

Two parts of 1.1'-diethyl thiocarbocyanine iodide were mixed with 1.2 parts of 2-methyl benzthiazole methiodide and dissolved in a mixture of 0.8 part of triethyl trithio orthoformate and 110 parts of acetic anhydride. The solution was boiled for one hour and gradually changed in colour from magenta to deep blue while a green precipitate formed. This was filtered off and recrystallised from methyl alcohol solution to yield the product as vivid green crystals, m. pt. 200° C. The yield was about 80% of that theoretically possible. Analysis for iodine gave the figure 31.75%, the compound of the above formula requiring 32.0%.

The above dyestuff, included in a gelatino silver iodobromide emulsion, imparts a band of sensitivity extending to 6300 Å. with a maximum at 6100 Å.

*Example 2*

Preparation of the compound of the probable formula:

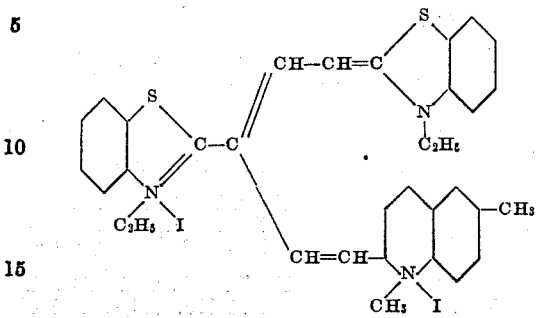

The procedure of Example 1 was followed using 2.5 parts of 1.1'-diethyl thiocarbocyanine iodide and 1.5 parts of p-toluquinaldine methiodide, and boiling for two hours, other conditions remaining the same. The product was obtained as dark green crystals with a bronze lustre, melting at 221° C. with decomposition.

The above dyestuff, included in a gelatino silver iodobromide emulsion, imparts a band of sensitivity with a maximum at 6000 Å.

*Example 3*

Preparation of the compound of the probable formula:

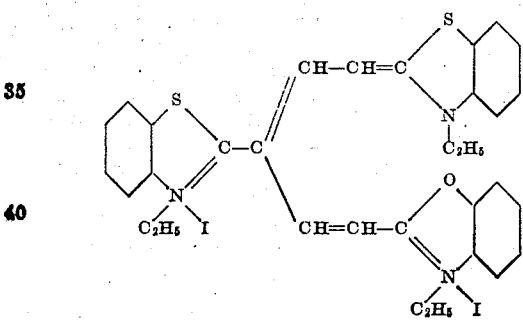

The procedure of Example 1 was followed using 2.5 parts of 1.1'-diethyl thiocarbocyanine iodide and 1.5 parts of 2-methyl benzoxazole ethiodide, and boiling for two hours, the other conditions remaining the same. The product was obtained as grass-green crystals, m. pt. 222° C.

The above dyestuff, included in a gelatino silver iodobromide emulsion, imparts a band of sensitivity extending to 6000 Å.

*Example 4*

Preparation of the compound of the probable formula:

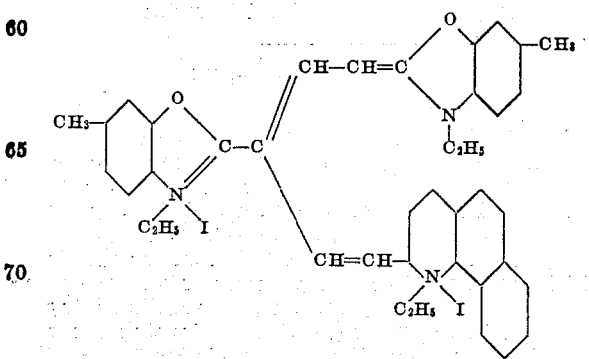

The procedure of Example 1 was followed using 2.5 parts of 1.1'-diethyl 4.4'-dimethyl oxacarbocyanine iodide and 1.5 parts of β-naphthaquinaldine ethiodide, and boiling for two hours, the other conditions remaining the same. The product was obtained as small dark-green needles, m. pt. 236° C.

The above dyestuff, included in a gelatino silver iodobromide emulsion, imparts a band of sensitivity extending to 7200 Å.

Example 5

Preparation of the compound of the probable formula:

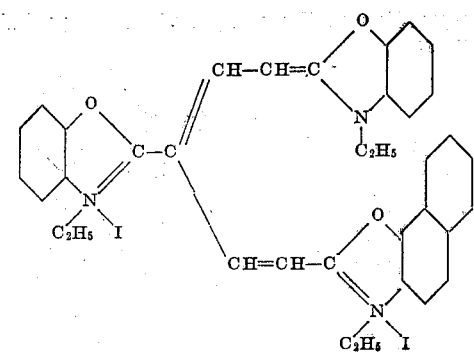

The procedure of Example 1 was followed using 2.5 parts of 1.1'-diethyl oxacarbocyanine iodide and 1.6 parts of 2-methyl β-naphthoxazole ethiodide, the other conditions remaining unchanged. The product was obtained as a brown dye, m. pt. 199° C. with decomposition.

The above dyestuff, included in a gelatino silver iodobromide emulsion, imparts a band of sensitivity extending to 6600 Å. with a maximum at 6200 Å.

Example 6

Preparation of the compound of the probable formula:

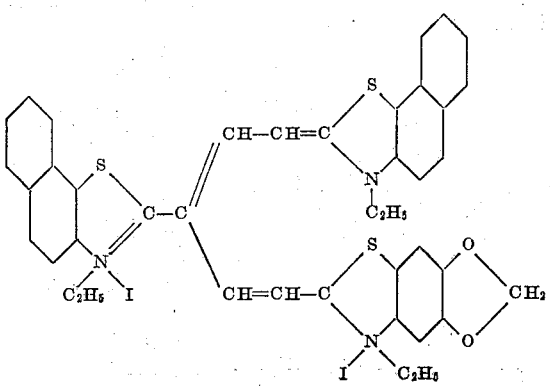

The procedure of Example 1 was followed using 3 parts of 1.1'-diethyl 3.4.3'.4'-dibenzthiocarbocyanine iodide and 1.73 parts of 2-methyl 4.5-dioxymethylene benzthiazole ethiodide, other conditions remaining unchanged. The dye was obtained as a dark green powder, m. pt. 227° C.

The above dyestuff, included in a gelatino silver iodobromide emulsion, imparts a band of sensitivity extending to 7200 Å. with a maximum at 6400 Å.

Example 7

Preparation of the compound of the probable formula:

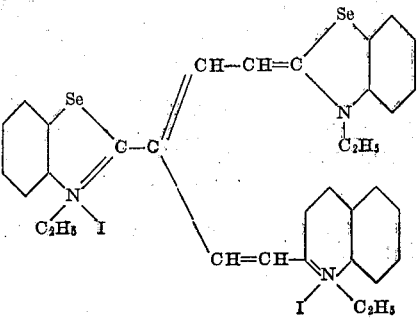

1.5 parts of 1.1'-diethyl selenocarbocyanine iodide and 1 part of quinaldine ethiodide were dissolved in a mixture of 0.6 part of triethyl trithio orthoformate and 55 parts of acetic anhydride. The solution was refluxed for two hours, cooled and the separated dye filtered off and recrystallised from methyl alcohol solution. It was obtained as metallic green needles, m. pt. 218° C. with decomposition.

The above dyestuff, included in a gelatino silver iodobromide emulsion, imparts a band of sensitivity with a maximum at 6200 Å.

Example 8

Preparation of the compound of the probable formula:

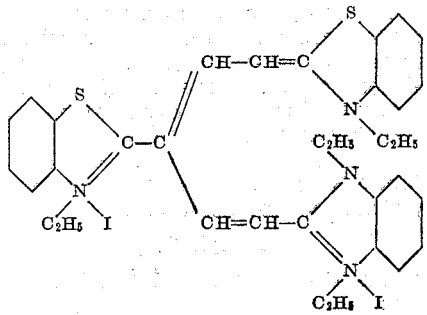

The procedure of Example 1 was followed using 2.5 parts of 1.1'-diethyl thiocarbocyanine iodide and 1.5 parts of 2-methyl-N-ethyl benzimidazole ethiodide, the quantities of other reagents remaining unchanged. After refluxing for two hours and cooling, some of the original dye separated out and this was filtered off and rejected. The filtrate was evaporated to small bulk when the required dye separated as a brown solid, m. pt. 170° C. with decomposition.

The above dyestuff, included in a gelatino silver iodobromide emulsion, imparts a band of sensitivity extending to 6200 Å. with a maximum at 6000 Å.

Example 9

Preparation of the compound of the probable formula:

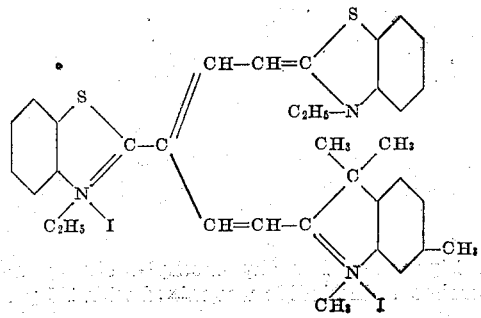

The procedure of Example 1 was followed using 2.5 parts of 1.1'-diethyl thiocarbocyanine iodide and 1.6 parts of 2.3.3'.6 tetramethyl indolenine methiodide. After boiling the solution was cooled and diluted with diethyl ether whereupon the desired dye separated as a green solid, m. pt. 170° C.

The above dyestuff, included in a gelatino silver iodobromide emulsion, imparts a band of sensitivity with a maximum at 6000 Å.

*Example 10*

Preparation of the compound of the probable formula:

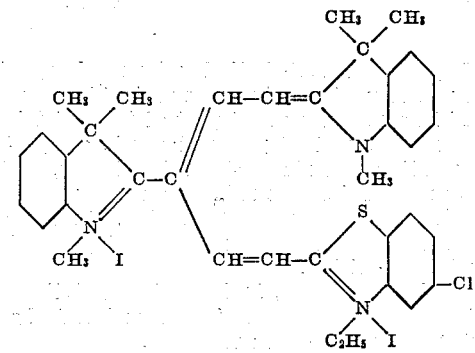

2.5 parts of indocarbocyanine was mixed with 1.67 parts of 2-methyl-5-chlor benzthiazole ethiodide and dissolved in a mixture of 51 parts of propionic anhydride and 0.8 parts of triethyl trithio orthoformate. After boiling for two hours a green powder separated from solution. This was filtered off and recrystallised from methyl alcohol to yield the desired dye as green crystals, m. pt. 236° C. with decomposition.

The above dyestuff, included in a gelatino silver iodobromide emulsion, imparts a band of sensitivity with a maximum at 6000 Å.

*Example 11*

Preparation of the compound of the probable formulae:

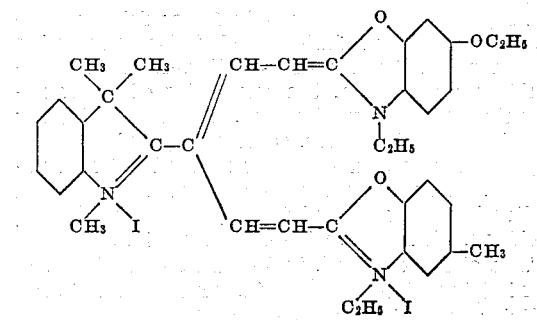

or

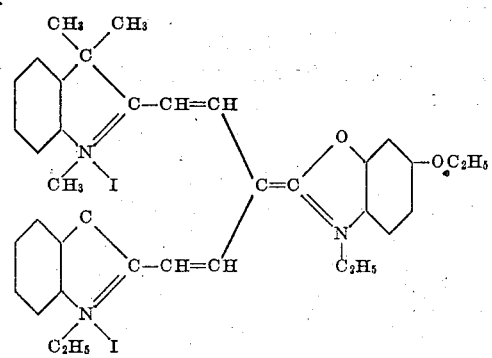

2.65 parts of 1-methyl-1'ethyl-5'ethoxy indoxacarbocyanine iodide was mixed with 1.5 parts of 2.5-dimethyl benzoxazole ethiodide and dissolved in a mixture of 0.8 part of triethyl trithio orthoformate and 66 parts of acetic anhydride. The solution was boiled for two hours, and the acetic anhydride then removed under reduced pressure. The residue was dissolved in methyl alcohol and diethyl ether added, whereupon the dye separated as a dark brown powder, m. pt. 127° C. with rapid decomposition.

The above dyestuff, included in a gelatino silver iodobromide emulsion, imparts a band of sensitivity with a maximum at 5800 Å.

*Example 12*

Preparation of the compound of the probable formula:

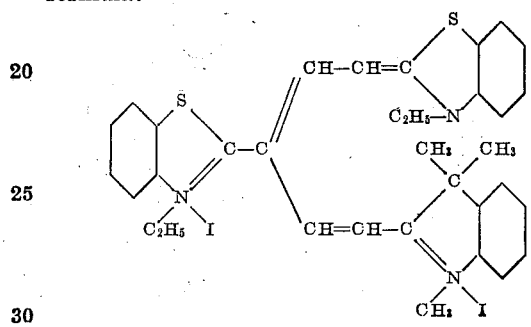

2.5 parts of 1.1'-diethyl thiocarbocyanine iodide was mixed with 1.6 parts of 2.3.3' trimethyl indolenine methiodide and dissolved in a mixture of 0.8 part of triethyl trithio orthoformate and 110 parts of acetic anhydride. The solution was boiled for two hours and then poured into hot water containing a trace of pyridine. The product separated as a tar which, after crystallisation from methyl alcohol, yielded the solid dye, m. pt. 178° C.

The above dyestuff, included in a gelatino silver iodobromide emulsion, imparts a band of sensitivity with a maximum at 6000 Å.

*Example 13*

Preparation of the compound of the probable formula:

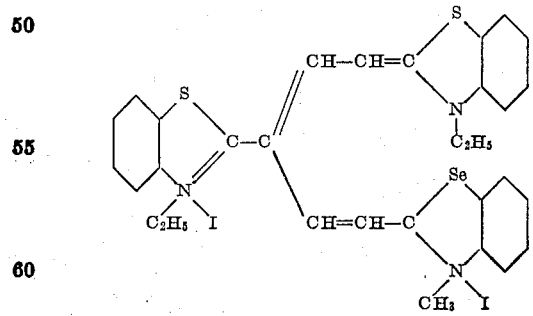

2.0 parts of 2-methyl benzselenazole were mixed with 1.86 parts of methyl p-toluene sulphonate and heated at 120° C. for three hours. The product was dissolved in 110 parts of acetic anhydride and 0.8 part of triethyl trithio orthoformate was added. The solution was heated to boiling and 2.6 parts of 1.1'-diethyl-thiocarbocyanine p-toluene sulphonate was added. The mixture was refluxed for two hours and then poured into aqueous potassium iodide solution containing a trace of pyridine. The dye separated and after recrystallisation from ethyl alcohol was obtained as green needles, m. pt. 225° C.

Example 14

Preparation of the compound of the probable formula:

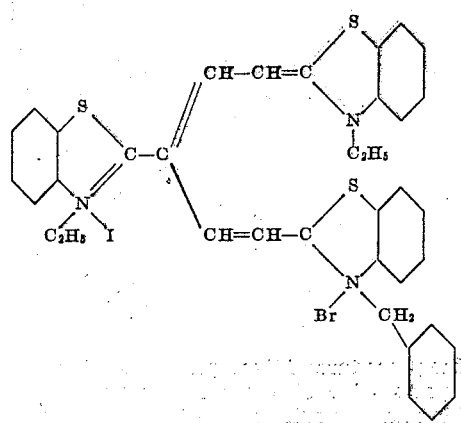

The procedure of Example 1 was followed using 3.0 parts of 1.1'-diethyl thiocarbocyanine iodide, 1.6 parts of 2-methyl benzthiazole benzyl bromide, 0.8 part of trimethyl trithio orthoformate and 44 parts of acetic anhydride. On cooling the boiled solution the dye separated, and after crystallisation from methyl alcohol solution was obtained as bronze crystals, m. pt. 238° C.

Example 15

Preparation of the compound of the probable formulae:

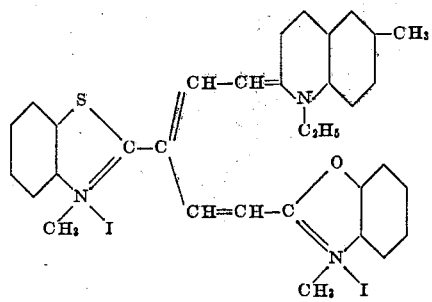

or

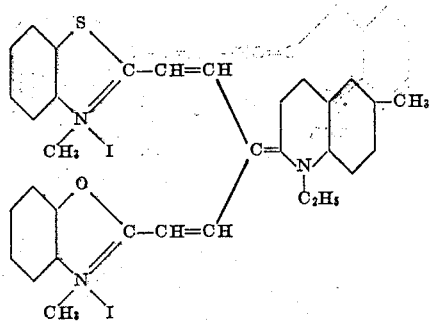

The procedure of Example 1 was followed using 3 parts of 1.6'-dimethyl-1'-ethyl thioquinocarbocyanine iodide and 1.4 parts of 2-methyl benzoxazole methiodide, other conditions remaining unchanged. The dye was obtained as a brown solid, m. pt. 237° C. with decomposition.

The above dyestuff, included in a gelatino silver iodobromide emulsion, imparts a band of sensitivity with a maximum at 6400 Å.

Example 16

Preparation of the compound of the probable formula:

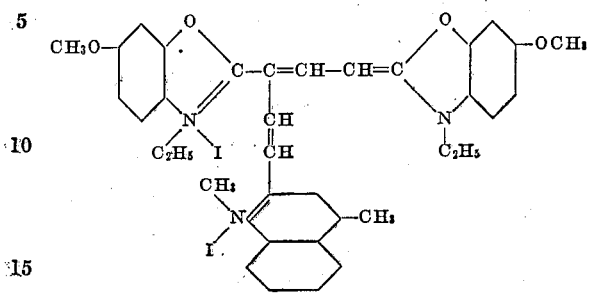

The procedure of Example 1 was followed using 2.5 parts of 3:3'-diethyl 6:6'-dimethoxy oxacarbocyanine iodide and 1.5 parts of 2:4'-dimethyl quinoline methiodide, the other conditions remaining unchanged. The dye was obtained as green needles, m. pt. 193° C. with decomposition.

The above dyestuff, included in a gelatino silver iodobromide emulsion, imparts a band of sensitivity extending to 7200 Å.

Analysis for iodine gave the figure 31.85%, the compound of the above formula requiring 32.07%.

Example 17

Preparation of the compound of the probable formula:

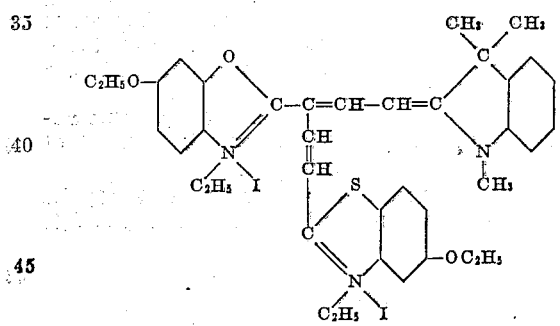

or

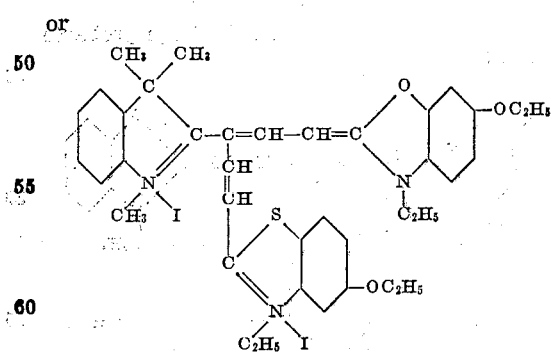

The procedure of Example 1 was followed using 2.65 parts of 1:3:3'-trimethyl 3'-ethyl 6-ethoxy indoxacarbocyanine iodide and 1.5 parts of 2-methyl 5-ethoxy benzthiazole ethiodide, other conditions remaining unchanged. The dye was obtained as green needles from methanol, m. pt. 190° C.

The above dyestuff, included in a gelatino silver iodobromide emulsion, imparts a band of sensitivity extending to 7200 Å.

Analysis for iodine gave the figure 29.23%, the compound of the above formula requiring 29.0%.

Example 18

Preparation of the compound of the probable formula:

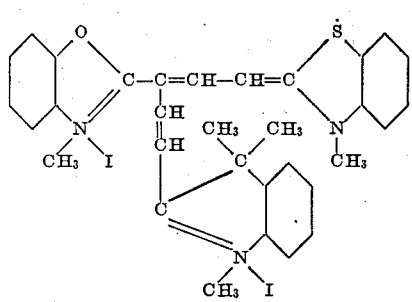

or

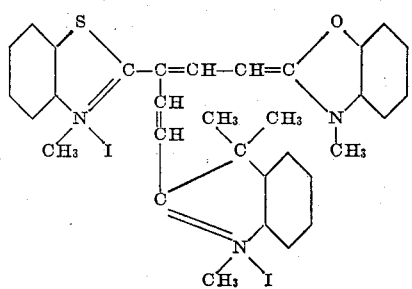

The procedure of Example 1 was followed using 2.5 parts of 3:3'-dimethyl oxathiocarbocyanine iodide and 1.5 parts of 2:3:3'-trimethyl indolenine methiodide. The dye was obtained as a brown solid, m. pt. 145° C.

The above dyestuff, included in a gelatino silver iodobromide emulsion, imparts a band of sensitivity extending to 7000 Å.

Analysis for iodine gave the figure 32.8%, the compound of the above formula requiring 33.5%.

Example 19

Preparation of the compound of the probable formula:

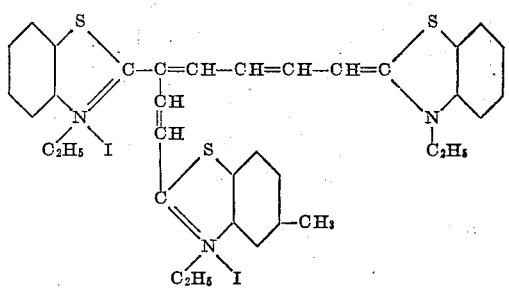

The procedure of Example 1 was followed using 1.5 parts of 3:3'-diethyl thiodicarbocyanine iodide and 1 part of 2:6'-dimethyl benzthiazole ethiodide. The dye was obtained as bronze crystals from methanol, m. pt. 248° C.

The above dyestuff, included in a gelatino silver iodobromide emulsion, imparts a band of sensitivity with a maximum at 7000 Å.

Analysis for iodine gave the figure 29.6%, the compound of the above formula requiring 32.0%.

Example 20

Preparation of the compound of the probable formula:

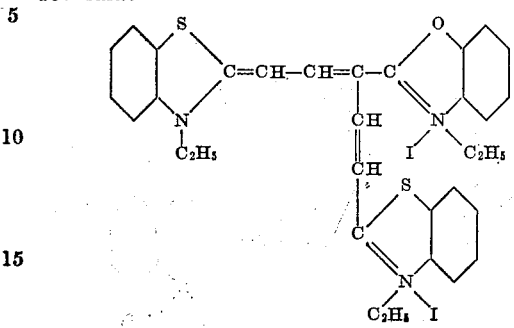

The procedure of Example 1 was followed using 2.4 parts of 3:3' diethyl thiaoxacarbocyanine iodide and 1.5 parts of 2 methyl benzthiazole ethiodide. The dye was obtained as brownish-green needles from methanol, m. pt. 235° C.

The above dyestuff, included in a gelatino silver iodobromide emulsion, imparts a band of sensitivity extending to 7050 Å.

Analysis for iodine gave the figure 32.05%, the compound of the above formula requiring 32.11%.

Example 21

Preparation of the compound of the probable formulae:

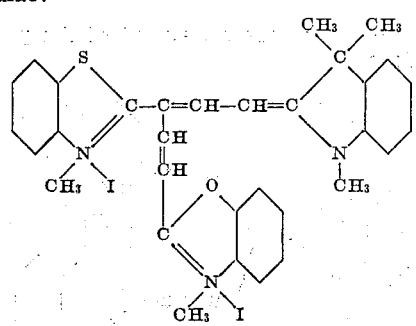

or

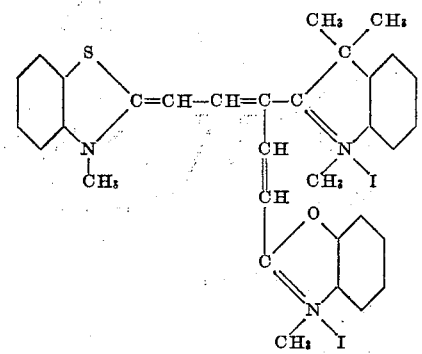

The procedure of Example 1 was followed using 2.5 parts of 1:3:3:3' tetramethyl indothiacarbocyanine iodide and 1.5 parts of 2 methyl benzoxazole methiodide. The dye was obtained as a brown solid, m. pt. 180° C. with strong decomposition.

The above dyestuff, included in a gelatino silver iodobromide emulsion, imparts a band of sensitivity with a maximum at 6000 Å.

Analysis for iodine gave the figure 33%, the compound of the above formula requiring 33.5%.

Example 22

Preparation of the compound of the probable formula:

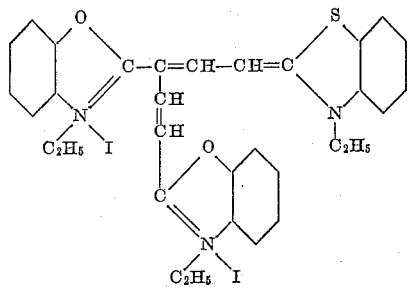

The procedure of Example 1 was followed using 2.4 parts of 3:3' diethyl thiaoxacarbocyanine iodide and 1.4 parts of 2 methyl benzoxazole ethiodide. The dye was obtained as dark green octahedra from methanol, m. pt. 140° C.

Analysis for iodine gave the figure 32.73%, the compound of the above formula requiring 32.75%.

This dye could also be obtained by a condensation of 2.5 parts of 3:3' diethyl oxacarbocyanine iodide and 1.5 parts of 2 methyl benzthiazole ethiodide.

It will be observed from the foregoing examples that some variation is made in the quantity of acetic anhydride used. As a practical point it has been found desirable to use the minimum quantity which is sufficient for the reaction since this facilitates the recovery of the final dyestuff.

Although the sensitising data have been given for the use of the dyes in a gelatino silver iodobromide emulsion, it is to be understood that the dyes may be usefully included in any silver halide emulsion, e. g. silver chloride or silver bromide, and also in such emulsions where the binding medium is other than gelatin, e. g. a vinyl polymer.

What we claim is:

1. A process for the production of trinuclear dyestuffs which comprises mixing a substantially pure carbocyanine of the general formula:

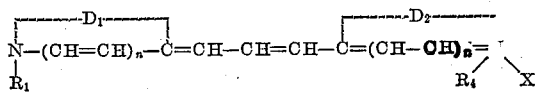

where $D_1$ and $D_2$ are each selected from the class consisting of residues of 5-membered and 6-membered heterocyclic nitrogen nuclei, X is an acid radicle, $R_1$ and $R_4$ are each selected from the class consisting of alkyl and benzyl groups, and $n$ is a cardinal number from 0 to 1, with a trithio orthoformic ester of the formula:

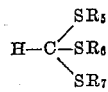

where $R_5$, $R_6$ and $R_7$ are each selected from the class consisting of alkyl and aralkyl groups, and with a compound of the general formula:

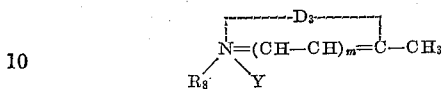

wherein $D_3$ is selected from the class consisting of residues of 5-membered and 6-membered heterocyclic nitrogen nuclei, $R_8$ is selected from the class consisting of alkyl and benzyl groups, Y is an acid radicle, and $m$ is a cardinal number from 0 to 1, heating the mixture in the presence of an acid condensing agent whereby there are removed from the reaction medium the compounds $R_5SH$, $R_6SH$ and $R_7SH$ formed during the condensation reaction, and separating from the reaction mixture the trinuclear dyestuff formed.

2. A process according to claim 1 wherein the trithio orthoformic ester employed is one in which the groups $R_5$, $R_6$ and $R_7$ are identical.

3. A process according to claim 1 wherein the trithio orthoformic ester employed is trithio orthoformic ethyl ester.

4. A process as set forth in claim 1 wherein said ester is trithio orthoformic ethyl ester and said condensing agent is acetic anhydride.

JOHN DAVID KENDALL.
JOHN RAYMOND MAJER.

REFERENCES CITED

The following references are of record in the file of this patent:

UNITED STATES PATENTS

| Number | Name | Date |
|---|---|---|
| 2,166,736 | White et al. | July 18, 1939 |
| 2,263,749 | White et al. | Nov. 25, 1941 |
| 2,282,115 | Brooker et al. | May 5, 1942 |
| 2,322,015 | Hamer et al. | June 15, 1943 |
| 2,340,882 | Kendall | Feb. 8, 1944 |
| 2,342,546 | Kendall | Feb. 22, 1944 |
| 2,353,164 | Kendall et al. | July 11, 1944 |
| 2,484,503 | Hamer | Oct. 11, 1949 |

OTHER REFERENCES

Chemical Abstracts 16, 3101 (Abstract of Brit. Med. Journal, 1922, I, 514–515).

Chemical Abstracts 19, 530 (Abstract of Proc. Roy. Soc., London, 96B, 317–333, 1924).

Kimura: Imperial Academy of Japan (1937), pp. 261–265.